United States Patent [19]

Mears

[11] Patent Number: 4,679,581
[45] Date of Patent: Jul. 14, 1987

[54] FUEL TANK VENT VALVE

[75] Inventor: William G. Mears, Kennett Square, Pa.

[73] Assignee: Mobil Oil Corporation, New York, N.Y.

[21] Appl. No.: 853,513

[22] Filed: Apr. 18, 1986

[51] Int. Cl.[4] .............................................. F16K 17/36
[52] U.S. Cl. ..................................... 137/43; 137/202; 137/512.2
[58] Field of Search ...................... 137/38, 39, 43, 202, 137/512.2

[56] References Cited

U.S. PATENT DOCUMENTS 3,084,706  4/1963  Lunde ............................. 137/202 X
3,530,882  9/1970  Case ................................ 137/202 X
4,000,828  1/1977  Crute ................................ 137/43 X

FOREIGN PATENT DOCUMENTS 1275350  5/1972  United Kingdom ............... 137/202

Primary Examiner—Robert G. Nilson
Attorney, Agent, or Firm—Alexander J. McKillop; Michael G. Gilman; Van D. Harrison, Jr.

[57] ABSTRACT

Disclosed is a valve configuration including a spring balanced, semi buoyant valve head containing within it a ball in a vertical channel. Closure of the valve head against a valve seat permits the escape of vapors through the veritcal channel until the presence of liquid fuel closes the ball against a second seat.

4 Claims, 12 Drawing Figures

FUEL TANK HIGH VOLUME VENT
VALVE WITH ROLLOVER SHUTOFF

FIG. 1A FUEL TANK HIGH VOLUME VENT VALVE WITH ROLLOVER SHUTOFF
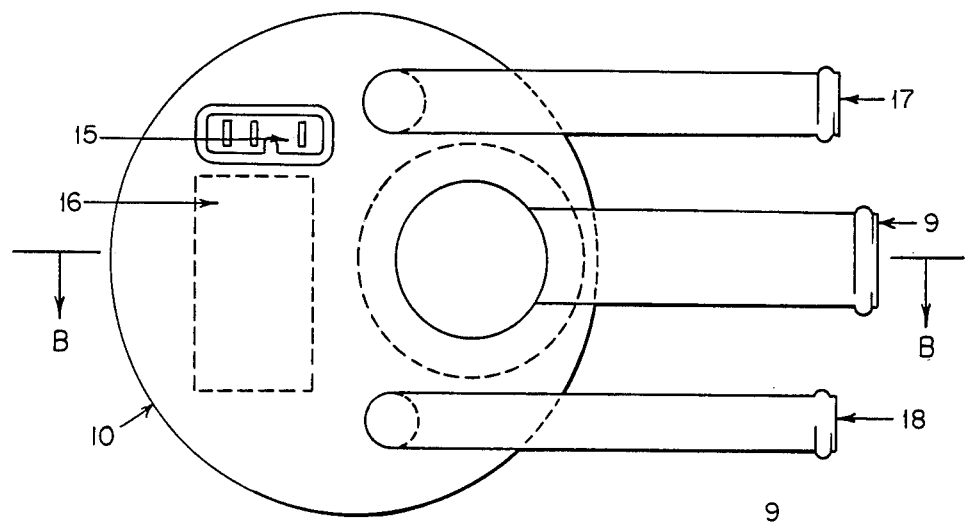
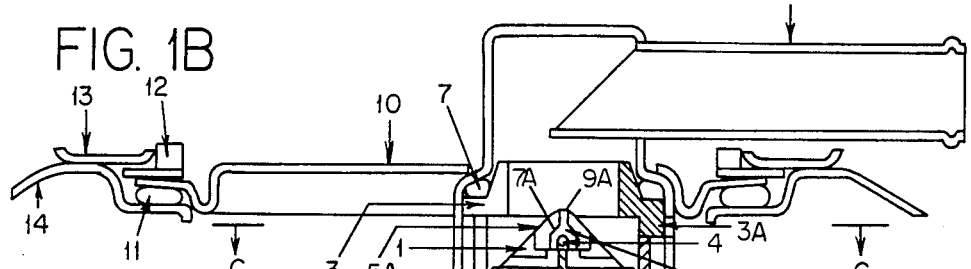
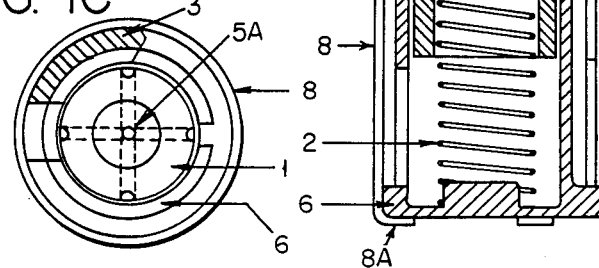
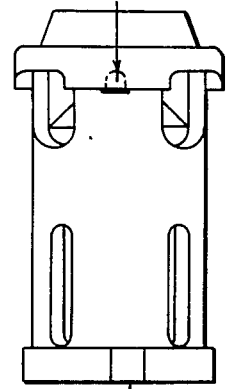
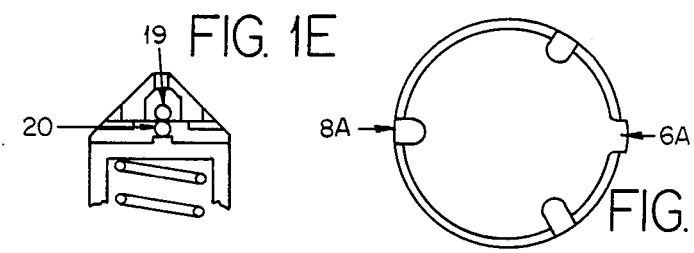

FUEL TANK HIGH VOLUME VENT VALVE WITH ROLLOVER SHUTOFF

FUEL TANK VENT VALVE

NATURE OF THE INVENTION

This invention is concerned with the values whose function primarily is to prevent the overfilling of fuel tanks and the loss of liquid fuel when fuel tanks are upset or overturned.

BACKGROUND OF THE INVENTION

In some geographical areas, it is now required that the hydrocarbon vapors displaced when refilling a gasoline fuel tank be captured in an absorbent system, such as in a carbon canister. It is a primary object of this invention to provide a valve which will permit the rapid and unrestricted displacement of vapors from such a tank in a refueling operation. Further, it is desirable that such a valve prevent the subsequent entry of liquid fuel into the vapor collection system when the tank is full. It is also desirable to have a vent valve which allows air to enter the tank as fuel is consumed. Also, such a valve should prevent loss of liquid fuel from the fuel tank through the valve from splashing during driving, and it is, of course, highly desirable to have a valve which would prevent fuel leakage in the event the fuel tank is inverted accidentally or otherwise displaced.

DESCRIPTION OF THE DRAWINGS

FIGS. 1A–1F presents one embodiment of the vent valve of this invention.

SUMMARY OF THE INVENTION

Figure 2A:
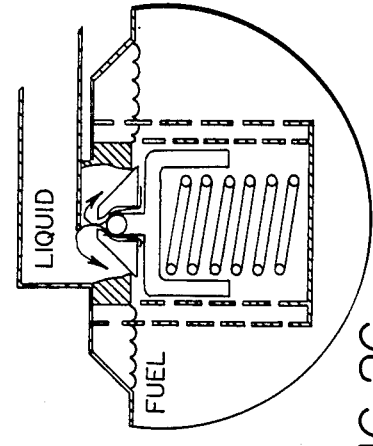
FIGS. 2A–2F shows the functioning of the valve when the tank in which the valve is mounted is displaced from a normally vertical position.

Briefly summarized, the invention comprises a float valve positioned in the upper portion of a fuel tank and so constructed that as the fuel level in the tank rises, the float valve will close and will, of course, still permit the escape of some vapors therefrom.

DETAILED DESCRIPTION OF THE INVENTION

In FIGS. 1A–1F, the valve of the invention is shown incorporated into a typical fuel tank gauge unit with the usual fuel supply 17 and return lines 18, gauge sending unit 16 and electrical plug 15 for the gauge unit, electrical fuel pump, and electrical ground. The sheet metal body 8 is soldered or brazed into the gauge unit cover. The vapor vent 9 is attached to the body also by soldering or brazing.

The working components of the valve consist of the float assembly 1, 4, 5, float guide 6, spring 2, and seal ring 3, as well as the gasket 7. All of these components are positioned within the body seating against the gasket 7. Alignment tabs 8A and 6A are provided to orient vapor cut-outs in the seal ring and float guide, and to offset openings in the body from those in the float guide. This ensures good vapor flow while providing baffling to reduce splashing effects. The valve assembly is forced against the gasket, and the metal tabs at the bottom of the body are bent over, retaining the valve in position.

The float assembly consists of a molded plastic float 1, plus a small molded ball retainer 5, which is pressed into the end of the float. Vent passages in the float below the sealing face engage with vent grooves around the ball in the retainer 5. The inside diameter 4A of the ball retainer guides the ball into the conical seat 7A to seal the vent outlet 9A in the tip of the ball retainer. Liquid flow through the vent passages in the float tends to move the ball into its seat, expediting liquid sealing during commencement of vehicle rollover. The float and spring are calibrated so that the relatively large opening shown is provided between the float and seal ring when the float is surrounded with vapor, but when liquid fuel begins to rise around the float, its buoyancy, combined with spring force, raises the float into sealing contact with the seal ring.

This design provides fuel shutoff high in the tank, and evaporative venting from the extreme top of the tank unit dome, thus minimizing liquid venting if the tank is overfilled. If vent shutoff at a lower level of liquid in the tank is required, the float can be made longer, extending further down into the tank, while retaining the vent passages in its upper tip. Alternatively, liquid venting may be provided though the fuel tank fill cap or auxiliary pressure relief valve. In this case, the small ball 19 in the tip of the float is made of a material which floats on the fuel, and a second heavy ball 20 is installed below it to hold the sealing ball against its seat in the event that the tank is accidentally inverted by the rolling over of the vehicle. This modification prevents any liquid from entering any vent lines connected to a refueling emission absorption canister.

The inner end of the vent tube 9 is cut at an angle away from the vent opening to present a baffle and to minimize carryover of liquid fuel droplets. The height of the body and tube is very little more than that of the fuel supply line on existing tank units, thus minimizing the need for more clearance in the floor pan above the tank.

Figure 2B:
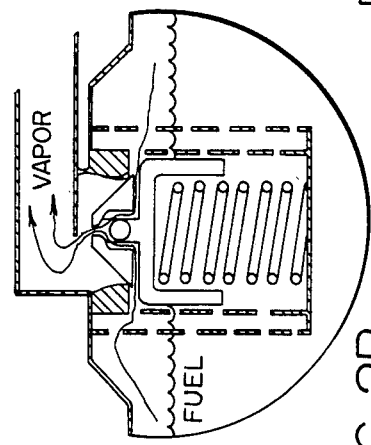
Figure 2C:
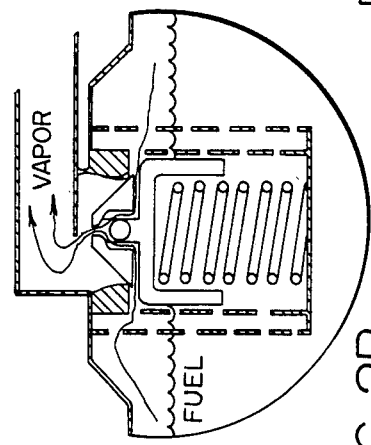
Figure 2D:
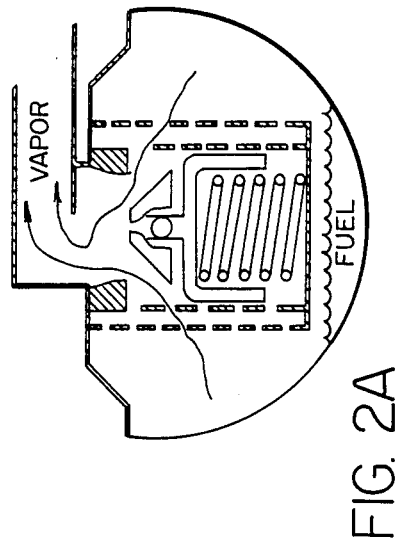
Figure 2E:
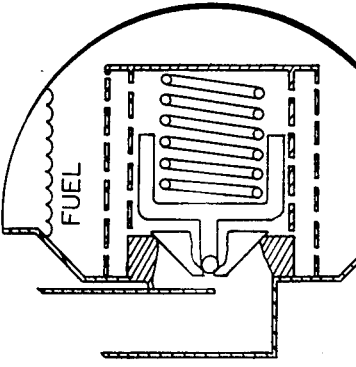
Figure 2F:
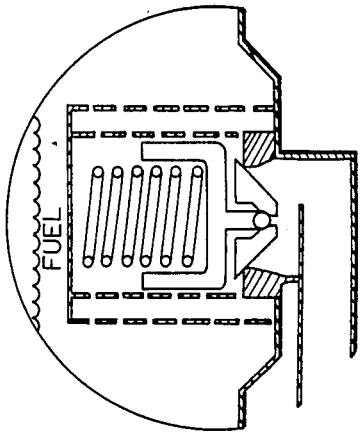

Operation of the valve is shown in FIGS. 2A–2F. In normal operation, the fuel level is below the float, so the float remains in its bottom position leaving a large opening for vapor venting. During refueling, the float 1 remains in this position until the fuel level nears the top of the fuel tank. When the tank is full, shutoff occurs because the float 1 rises against the seal ring 3. Because a vapor space is left above the fuel, vapor venting can occur through the small vent passages 5A in the tip of the float. These passages are sufficiently restrictive to discourage overfilling the tank. However, if the tank is overfilled, liquid fuel will bleed slowly through the small vent passages if the fuel warms and expands. The vent passages are at the extreme top of the tank, minimizing the amount of liquid fuel which will bleed off before the liquid level drops below the vent. Because the plastic sealing ball 4 is more dense than fuel, it will remain at the bottom of the ball retainer as liquid fuel passes it slowly. If liquid fuel is forced past it by extreme overfuelling attempts, the ball 4 will be swept upward into its seat by the greater flow of fuel and will be held seated as long as pressure is held on it. Under this condition, the fuel tank pressure relief safety valve would take over to prevent tank overpressure. If full liquid sealing is required to prevent any liquid from escaping through the vent valve, the float assembly can be constructed to contain a second sealing ball as shown at 19 and 20 which would float on liquid fuel flowing into the small vent passages, sealing the outlet in the tip of the float. The ball 19 has a density less than that of the liquid fuel. The ball 20 has a density greater than the liquid fuel and is sufficiently heavy to outweigh the buoyancy of the ball 19. In accidental rollover situations, the heavier weighted ball would sink against the sealing ball, preventing it from floating off its seat.

Fuel movement in the tank is prevented from splashing out the large vent opening 9 by the baffle effect of the offset between cutouts in the body and in the float guide. If the fuel level in the vicinity of the valve rises because of braking, accelerating, cornering or vehicle rollover, the float is raised against its seat, as shown in FIGS. 2-4. Liquid flow through the small float vent passages pushes the ball toward its seat, reducing or eliminating liquid leakage. When the fuel level drops away from the valve, liquid fuel which leaked into the body vapor dome drains back through the large vent opening when the float drops.

If the vehicle rolls 90°, the float seals and is held against the seal ring by both spring force and hydrostatic pressure. The sealing ball is held against its seat by hydrostatic pressure alone. If the vehicle rolls over to 180°, the valve remains sealed, with gravity increasing the sealing force on both the float and ball particularly if the seal is made up of 2ball sealers as in 19 and 20 above.

To enhance understanding of the valve assembly of this invention the following summary of some of the reference numerals is provided.

(1) FLOAT: Nylon or similar plastic more dense than fuel.

(2) SPRING: Corrosion resistant. Calibrated to allow float to drop well away from seal ring when surrounded by vapor, but to lift float against seal ring when liquid fuel rises around float.

(3) SEAL RING:
Plastic or metal.
Alignment Tab. Assures alignment of vapor vent cutouts in seal ring and float guide.

(4) BALL: Plastic or elastomer slightly more dense than fuel.

(5) BALL SEAT: Similar material to float. Pressed into float to retain ball. By-pass cutouts around ball align with vent holes in float.

(6) FLOAT GUIDE:
Similar material to float.
Alignment Tab. Maintains offset between vapor vent cutouts in float guide and body.

(7) VENT GASKET: Elastomer.

(8) BODY:
Metal, soldered or brazed into tank unit cover.
Holding Tab. Bent over to hold float guide and seal ring against vent gasket.

(9) VAPOR VENT: Metal, soldered or brazed into body.

(10) TANK UNIT COVER: Metal, similar to existing designs.

(11) TANK UNIT GASKET: Elastomer, similar to existing designs.

(12) LOCKING RING: Metal, similar to existing designs.

(13) REACTION RING: Metal, soldered or brazed to tank. Similar to existing designs.

(14) TANK: Metal, similar to existing designs.

(15) ELECTRICAL PLUG: Plastic and metal, similar to existing designs.

(16) GAUGE UNIT: Similar to existing designs.

(17) FUEL SUPPLY: Metal, soldered or brazed into tank unit cover, similar to existing designs.

(18) FUEL RETURN: Metal, soldered or brazed into tank unit cover, similar to existing designs.

(19) SEAL BALL: Hollow or foam plastic or elastomer less dense than fuel.

(20) WEIGHT BALL:
Metal or sufficiently dense material to prevent (19) seal ball from floating in fuel when float assembly is inverted.

I claim:

1. A fuel tank vent valve comprising:
   (a) a hollow, elongated housing adapted to be positioned at a vertical or near vertical position within a liquid fuel tank, said housing having at its upper end a valve seat communicating with the exterior of said tank and having at least one port communicating with the interior of said tank;
   (b) a float slidably mounted within said housing and adapted to form a liquid-tight seal when seated against said valve seat of said hollow, elongated housing, and having an interior hollow channel communicating with the exterior of said tank when said float is seated against said valve seat and communicating with the port in said housing;
   (c) a ball positioned within said interior hollow channel adapted to seal said interior channel when said float is positioned against said valve seat of (c), said ball having a density greater than that of the liquid fuel present or to be present in the fuel tank; and
   (d) means for urging said float, upwardly against said valve seat.

2. The fuel tank vent of claim 1 wherein said means for urging is a spring.

3. The fuel tank vent valve of claim 1 wherein said interior hollow channel contains two balls, one ball being less dense than the liquid fuel and the second ball being more dense than said liquid fuel.

4. The fuel tank valve of claim 1 wherein said float has a conical exterior surface.

* * * * *